(No Model.)

L. A. SANFORD.
SPIRIT LEVEL

No. 337,621. Patented Mar. 9, 1886.

WITNESSES:
M. S. Seeley
James G. Clark

INVENTOR
L. Arthur Sanford.
BY
Geo. D. Seymour
ATTORNEY

UNITED STATES PATENT OFFICE.

L. ARTHUR SANFORD, OF BRISTOL, CONNECTICUT, ASSIGNOR OF TWO-THIRDS TO LEVERETT A. SANFORD AND RUFUS A. SANFORD, OF SAME PLACE.

SPIRIT-LEVEL.

SPECIFICATION forming part of Letters Patent No. 337,621, dated March 9, 1886.

Application filed October 26, 1885. Serial No. 180,896. (No model.)

*To all whom it may concern:*

Be it known that I, L. ARTHUR SANFORD, residing at Bristol, in the county of Hartford and State of Connecticut, have invented certain new and useful Improvements in Levels; and I do declare the following to be a full, clear, and exact description of the same, reference being had to the accompanying drawings, which form a part of this specification.

My invention relates to an improvement in levels having a confined body of liquid and a float resting upon and shifting with the same for furnishing the indications.

Figure 1:
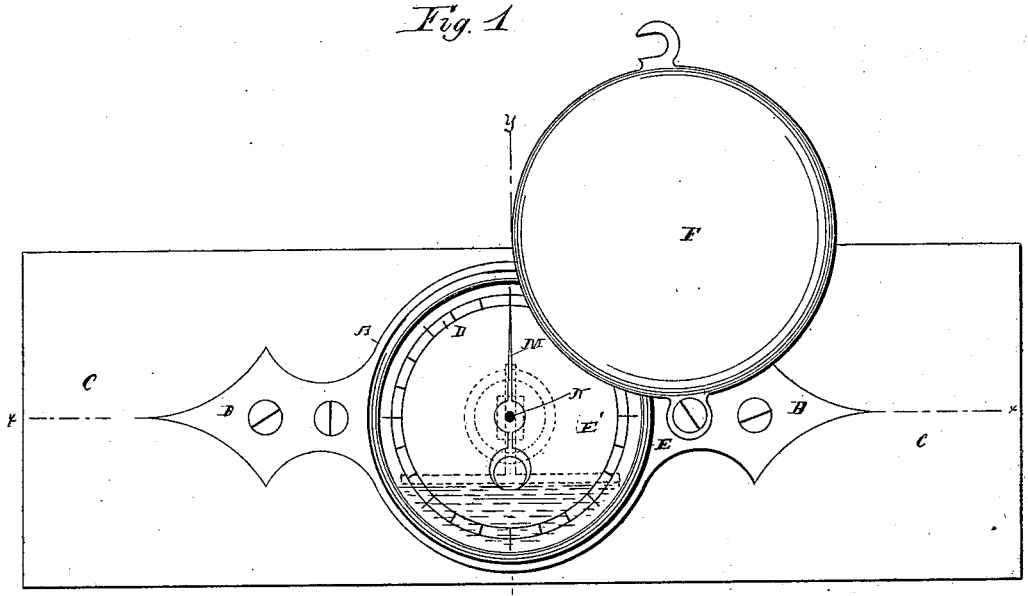
Figure 2:
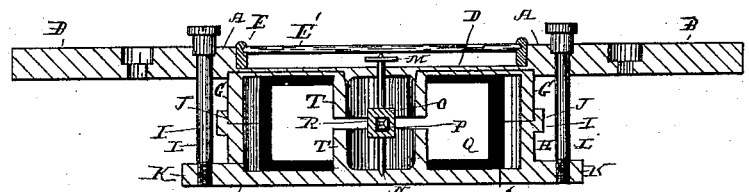
Figure 3:
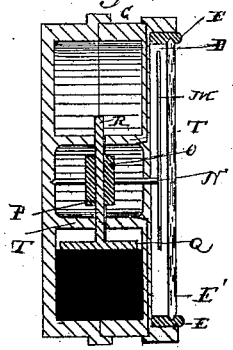

In the accompanying drawings, Figure 1 is a view in elevation of one form which a level embodying my invention may assume. Fig. 2 is a sectional view thereof on the line $x\,x$ of Fig. 1, and Fig. 3 is a similar view on the line $y\,y$ of said figure.

A is a plate provided with extensions B B, through which it is secured to the frame C.

D is a depressed graduated surface, from which the indications are read.

E is a grooved ring set into the depression in the plate, and carrying a glass, E', which covers and protects the graduated surface D.

F is a cover pivotally secured to the plate A, and serves to protect the glass when the level is not in use.

G is an annular cup located upon the back of the plate A.

H is a similar cup, having its edge provided with a flange, I, and a rabbet, J, to fit over the edge of the cup G. The cup H is also provided with lugs K K, extending from opposite faces of the cup and receiving tap-bolts L L, extending through the plate A, as shown. A pointer, M, located between the graduated surface D and the glass E', is secured to an arbor, N, projecting through the center of the graduated surface, which, as herein shown, forms part of the plate A, and having bearing in the said plate and in the cup H, and carrying a hub, O, having a square opening, P, as shown. An oblong float, Q, adapted in its dimensions to play freely in the chamber inclosed by the cup, is provided with a square stem, R, passing through the opening P of the hub O, so as to move freely therein, and made square, so as to prevent the float from turning or deflection toward either of the cups. A sufficient body of mercury, S, to support or sustain the float free from all contact with the cups is located within them. Each cup is provided with an annular flange, T, for excluding the mercury from the bearings of the arbor when the level is laid or turned down on either side. The pointer is set on the arbor to register with the naught of the graduated surface when the frame of the device is in a true level. Then any deflections from such level will shift the mercury, which will move the float and cause it to turn the arbor so that the pointer carried by the same will indicate upon the graduated surface the exact amount of deflection in the device from the true level.

A level embodying my invention is accurate in its indications, as the liquid will push the float into place in its plane and overcome any friction of bearings. Furthermore, it is unaffected in its indications by atmospheric changes; nor is it affected by slight changes in the quantity of liquid, for the reason that the float, being loosely connected with the arbor, automatically accommodates itself to such variations and changes. The action of the level is also prompt, as the action of gravity quickly brings the liquid into a state of equilibrium or repose in which it prevents all movement in the float, and hence vibration in the pointer. The promptitude of the instrument in furnishing the indications will of course depend upon the nature of the liquid employed. Mercury, being very heavy, will afford quicker indications than other liquids, and is also recommended as undergoing slight variation in volume under atmospheric changes. Mercury may, however, be replaced by other liquids, and the specific construction herein shown may be altered as desired.

I would therefore have it understood that I do not limit myself to the exact construction and arrangement of parts herein shown and described, but hold myself at liberty to make such changes and alterations as fairly fall within the spirit and scope of my invention.

Having fully described my invention, what I claim as new, and desire to secure by Letters Patent, is—

1. A level having a confined body of liquid, a float resting thereupon and shifted with the same, an indicator, and adjustable connection between the same and the float, substantially as set forth.

2. A level having a confined body of liquid, a float resting thereupon and shifted with the same, an indicator, and automatically-adjustable connection between the same and the float, substantially as set forth.

3. A level having a confined body of liquid, a float resting thereupon and shifted with the same, an arbor, a float-stem attached to the float and adjustably connected with the arbor, and a pointer or indicator secured to the arbor, substantially as set forth.

4. A level having a body of liquid confined in a circular chamber, a float resting upon the liquid and shifted therewith, an arbor located in the center of such chamber, and adjustable connection between the arbor and float, substantially as set forth.

5. A level having a body of liquid in a chamber composed of two circular cups provided with annular flanges, substantially as shown, a float resting upon the liquid and shifted by the same, an arbor centrally pivoted in said cups and provided with a hub having a square opening, a float-stem secured to the float and passing through the hub of the arbor so as to move freely therein, a pointer mounted upon the arbor, and a graduated surface, substantially as set forth.

In testimony whereof I have signed this specification in the presence of two subscribing witnesses.

L. ARTHUR SANFORD.

Witnesses:
LEVERETT A. SANFORD,
GEORGE ATKINS.